United States Patent [19]
Hama

[11] Patent Number: 4,473,278
[45] Date of Patent: Sep. 25, 1984

[54] APERTURE STRUCTURE IN ZOOM LENS

[75] Inventor: Yoshihiro Hama, Tokyo, Japan

[73] Assignee: Asahi Kogaku Kogyo Kabushiki Kaisha, Tokyo, Japan

[21] Appl. No.: 318,099

[22] Filed: Nov. 4, 1981

[30] Foreign Application Priority Data

Nov. 10, 1980 [JP] Japan ................. 55-157999

[51] Int. Cl.³ ............................................. G02B 15/00
[52] U.S. Cl. ................................................. 350/429
[58] Field of Search ......................................... 350/429

[56] References Cited

U.S. PATENT DOCUMENTS 3,906,529 9/1975 Filipovich ................... 350/429
4,141,636 2/1979 Shimojima ................... 350/429

Primary Examiner—John K. Corbin
Assistant Examiner—R. Gass
Attorney, Agent, or Firm—Sughrue, Mion, Zinn, Macpeak & Seas

[57] ABSTRACT

A separate set of aperture blades is provided for varying the maximum full aperture of a zoom lens as its magnification is changed. The second set of aperture blades are pivotally mounted to a support plate which also rotatably supports the conventional aperture blades.

5 Claims, 2 Drawing Figures

APERTURE STRUCTURE IN ZOOM LENS

BACKGROUND OF THE INVENTION

This invention relates to the aperture structure of a zooming lens.

A zooming lens whose full-aperture diameter is varied with zooming is known in the art. A zooming lens of this type needs a mechanism for adjusting the full-aperture diameter during zooming and for also adjusting aperture diameters having JIS series F values other than the full-aperture value with zooming. Typical examples of such a mechanism have been disclosed in the specifications of Japanese Patent Application Publication No. 20911/1965, Japanese Patent Application Laid-Open No. 24134/1974 and Japanese Utility Model Application Laid-Open No. 123933/1978.

In such a conventional zooming lens, as shown in FIG. 1, an aperture blade 4 is rotated by an opening and closing ring 2, in order to obtain aperture diameters corresponding to JIS series F values other than the full-aperture value. When the aperture blade 4 returns toward the position of the full-aperture diameter after a photographing operation has been completed, the rotation of the opening and closing ring 2 adapted to operate the aperture blade 4 must be stopped at a predetermined position so that the aperture blade may not be opened more than the full-aperture diameter corresponding to the present zooming position of the lens.

However, a release plate 1 on the camera body side carries out an automatic lens stopping operation by moving in the direction of arrow A to transmit the lens stop down operation from the camera body to the ring 2 through a drive lever 5. This plate 1 is so designed that, after the photographing operation has been accomplished, the release plate 1 is moved in the direction of arrow B to an idle position which is independent of the zooming position of the lens and is beyond the predetermined position at which the aperture blade 4 is opened to its predetermined full-aperture diameter corresponding to the zooming position of the lens. This is referred to as an idle operation which is effected to positively set the aperture blade for a desired full-aperture diameter according to the relationship between the camera body and the lens. In an EE control system, the amount of movement of the release plate past its position corresponding to the full aperture to its position corresponding to the stop of the drive lever 5 is the amount of "pre-run" for adjusting exposure levels of interchangeable lenses which are different according to the types of interchangeable lenses. This operation is described in the specification of Japanese Patent Application No. 19966/1980 filed by the present applicant.

With the aperture blade set for a predetermined full-aperture diameter corresponding to the zooming position of the lens, the release plate 1 must be moved further, and therefore in the conventional zooming lens a protective spring 6 is interposed between the opening and closing ring 2 and the release plate 1 as shown in FIG. 1 so that, as the lever 5 continues to pivot clockwise after the aperture blade 4 has stopped at its maximum aperture position, the expansion of the protective spring 6 absorbs the excess stroke until the plate 1 stops at the predetermined idle position to which it continues to move.

However, since the protective spring 6 is interposed between the ring 2 and the release plate 1 as described above, the effective operating force of an aperture spring 7 is reduced by as much as the difference between the protective spring load and the aperture spring load, or by as much as the protective spring load, depending upon the position of the protective spring provided.

In a zooming lens in which the automatic lens stopping operation is controlled by allowing the plate 1 to move in the direction of arrow A and then stopping the release plate 1 after it has been moved as much as a stroke which is defined by EE control, programmed EE control or body preset control, the presence of the protective spring 6 makes the amount of rotation of ring 2 inaccurate, as a result of which the aperture operation becomes irregular and the response of the ring 2 to the release plate 1 is degraded in accuracy, all of which increases the lens stopping error. Furthermore, the inertial mass of the drive system required to drive the aperture blade is increased.

Thus, the conventional variable aperture diameter zooming lens suffers from at least the following problems:

(1) Since the aperture blade driving spring force cannot be sufficiently increased, it is difficult in the case of a lens having a large aperture diameter according to the above-described system to achieve a sufficiently fast aperture blade operating time (which is the sum of the time required for stopping the lens to a predetermined aperture value and the time during which the bouncing occurs while the lens stopping operation is damped until the aperture diameter become sufficiently stable in a certain range). Thus, the lens aperture may not stabilize before the shutter operation is effected. Thus, it is difficult to satisfactorily manufacture such a lens.

(2) Since the inertial mass of the aperture blade driving system is large, it is also difficult to manufacture a lens having a large aperture diameter variation.

(3) The aperture blade operation is liable to become irregular in the case of EE control, and therefore the aperture control error is increased.

SUMMARY OF THE INVENTION

This invention is intended to solve the above-described problems involved in a conventional variable aperture diameter zoom lens. The specific feature of the invention resides in that a lens stop for full-aperture only and a lens stop for aperture diameters other than the full-aperture diameter are both provided at the position of the conventional lens stop, and the aperture blades of the two lens stops are supported by one and the same supporting plate, so that the two lens stops operate to change the respective aperture diameters simultaneously by turning the supporting plate during the zooming operation, but the normal lens stop can be operated independently of the full-aperture stop during the stop down operation.

BRIEF DESCRIPTION OF THE DRAWINGS

This invention will be described with reference to the accompanying drawings, in which.

DETAILED DESCRIPTION OF THE INVENTION

Figure 1:
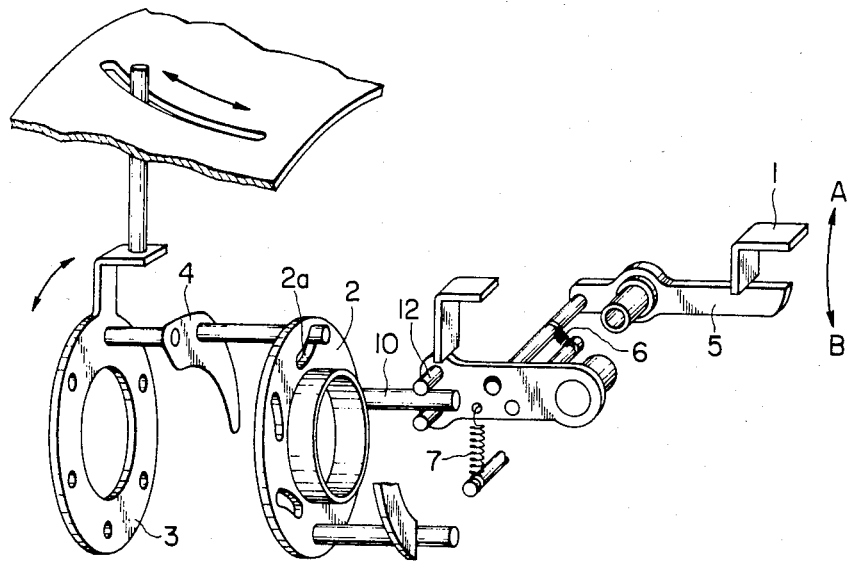
FIG. 1 is a perspective view of the essential components of a conventional zoom lens.
Figure 2:
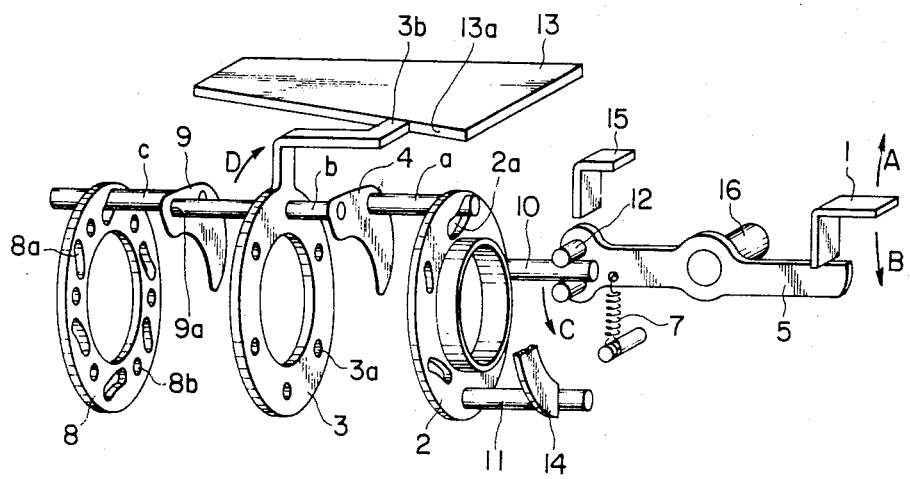
FIG. 2 is a perspective view showing the essential components of one example of a zoom lens according to this invention.

One example of the aperture structure of a zooming lens according to this invention is as shown in FIG. 2. In FIGS. 2 and 1, like parts are designated by like reference numerals or characters.

A release plate 1 operates to control the aperture diameter of the lens in association with the photographing operation in a camera body (not shown). The release plate 1 is stopped after retracting to a predetermined position in the direction of the arrow A in an ES control or manual shutter control photographing operation, or after retracting as much as a stroke corresponding to a desired aperture value in a programmed EE control, EE control or body preset control photographing operation, to thereby control the lens aperture diameter so that the lens is not stopped down beyond the desired aperture diameter.

A drive lever 5 is rotatable about a drive lever shaft 16 embedded in the lens barrel body (not shown), and it is urged in the direction of the arrow C (the stop down direction) by an aperture spring 7. Two drive pins 12 are embedded in the drive lever 5, holding a lens stop turning pin 10. The pin 10 is embedded in an opening and closing ring 2 in such a manner that it is perpendicular to the ring 2. The ring 2 is moved integrally with the lens barrel and turned around the optical axis in a zooming operation. A lens stopper pin 11 is embedded in the ring 2, and cam grooves 2a are cut in the ring 2, and lens stop dowels a embedded in aperture blades 4 are inserted into respective cam grooves 2a. Each aperture blade 4 has a lens stop dowel b which is extended from the aperture blade 4 in a direction opposite to the direction of extension of the lens stop dowel a. A supporting plate 3 is so designed that it moves with the movable lens barrel and turns around the optical axis. The lens stop dowels b are extended through supporting holes 3a cut in the supporting plate 3 and are rotatably fitted in lens stop shaft holes 9a about which full-aperture blades 9 provided for a full-aperture only are turned.

A bent protrusion 3b is extended from the upper edge of the supporting plate 3. The protrusion 3b is abutted against a full-aperture correcting cam surface 13a which is formed on a side of a relay ring 13 which is fixedly secured to the lens barrel body (not shown). The protrusion is urged in the direction of the arrow D by a spring (not shown). A lens stop dowel c is embedded in each full-aperture blade 9. The lens stop dowels c are engaged with respective cam grooves 8a which are cut in a full-aperture ring 8. The ring 8 is not turned, being fixedly secured to the movable lens barrel (not shown).

An intermediate lever 14 is set at a position corresponding to an aperture value which is set by an aperture value scale ring (not shown) and a lens stop cam member (not shown). When the lens stop is operated in the ES or manual shutter control photographing operation, the intermediate lever 14 operates to stop the lens stop stopper pin 11 of the opening and closing ring 2 as the ring 2 rotates in the stop down operation to thereby determine the aperture value. In the case of the programmed EE control, EE control or body preset control photographing operations, the intermediate lever 14 is retracted; that is, the lever 14 is brought into contact with the stopper pin 11 only for the minimum aperture diameter, or it is not brought into contact with the stopper pin 11 at all in these cases.

A full-aperture stopper 15 is fixedly secured to the lens barrel body and operates to stop the rotation of the drive lever 5 when the latter is pushed by the release plate 1, to set an amount of pre-run. When the lens stop is operated in the ES or manual shutter control photographing operation, the release plate 1 is quickly retracted to the predetermined position in the direction of the arrow A. The drive lever 5, being urged by the aperture spring 7, is turned in the direction of the arrow C to drive the opening and closing ring 2 through the lens stop turning pin 10 engaged with the two drive pins 12. As a result, the ring 2 is turned until the stopper pin 11 strikes the intermediate lever 14 which has been set at a position corresponding to the desired aperture diameter.

As the cam grooves 2a in the ring 2 are turned, the aperture blades 4 are turned about the lens stop dowels b, thus stopping down the lens.

After the photographing operation has been accomplished, the release lever 1 is moved in the direction of the arrow B opposite to the direction of the arrow A in which the release lever 1 was moved to stop down the lens. The drive lever 5, being pushed by the release lever 1, is turned clockwise against the elastic force of the aperture spring 7 to turn the cam grooves 2a of the ring 2 in a direction opposite to the direction in which the cam grooves 2a were turned to stop down the lens. As a result, the aperture blades 4 are raised to provide the full-aperture diameter, and the drive lever 5 is stopped, abutting against the full-aperture stopper 15.

In the programmed EE control, EE control or body preset control photographing operations, the release lever 1 is stopped after retracting in the direction of the arrow A by an amount which allows the drive lever 5 to move an amount which corresponds to a desired aperture diameter for the lens. Similarly as in the manual shutter control photographing operation, the lens stopping operation is carried out with the aid of the aperture spring 7; however, the aperture diameter control is carried out by the limitation of the operation of the drive lever 5 which is effected when the release plate 1 is stopped. After the photographing operation, the lens is set to the full aperture similarly as in the manual shutter control photographing operation.

The aperture diameter is varied with zooming as follows. The supporting plate 3 together with the movable lens barrel is moved by zooming the lens. That is, the supporting plate 3 is moved in the direction of the optical axis relative to the relay ring 13 which is fixedly secured to the lens barrel body. Therefore, the protrusion 3b of the supporting plate 3 is slid along the full-aperture correcting cam surface 13a of the relay ring 13 by the elastic force of the spring, so that the supporting plate 13 is turned as much as the variation of level of the cam surface 13a in association with the zooming operation. Accordingly, the aperture blades 4 change the aperture diameter similarly as in the case where the opening and closing ring 2 is turned.

Furthermore, since the lens stop dowels b support the full-aperture blades 9 and the full-aperture ring 8 is fixed, the full-aperture blades 9 change the aperture diameter with the aid of the cam grooves 8a in the full-aperture ring 8 similarly as in the case of the aperture blades 4. Thus, the aperture blades 4 and the full-aperture blades 9 change their aperture diameters simultaneously. With the aperture diameter thus changed, the aperture blades 4 can still carry out a preset automatic lens stopping operation, a manual lens stopping operation or an EE control lens stopping operation. In these operations, the aperture blades 4 are supported by the dowels b which are now at different positions, and therefore the aperture blades 4 can provide suitable aperture diameters for respective focal lengths which are provided by the zooming operations. When the zoom lens is mounted on the camera body, the aperture blades 4 are raised to provide the amount of prerun, and therefore the full-aperture diameter is set by the full-aperture blades 9 which are operated only by the zooming operation.

While the invention has been described with reference to its preferred embodiment, it will be understood that the invention is not limited thereto or thereby. For instance, the preferred embodiment operates by moving the plate 3 and lens stops longitudinally with zooming while the plate 13 remains stationary. However, in a zoom lens in which, although the aperture diameter is changed by zooming, the lens stop position along the optical axis is not changed, the aperture correcting cam surface 13a may instead be moved in associated with the zooming operation and the cam surface 13a may also be moved in a direction such as a vertical direction other than the optical axis direction if required by the design.

In the above-described embodiment, the lens stop operating mechanism is of the drive lever type; however, a lens stop operating mechanism of driven ring type in which a drive ring turns around the optical axis to transmit the operation of the release plate to the opening and closing ring may be used instead, or a lens stop operating mechanism of drive lever type in which a drive lever is operated with the shaft as a fulcrum which is secured to the lens barrel in parallel with the optical axis, rather than perpendicular thereto as with the shaft 16, may be used. If the aperture diameter is not to be in proportion to the operation of the release lever, the cam grooves in the opening and closing ring and in the full-aperture ring may be elongated grooves. The cam grooves or the elongated grooves may be formed in the aperture blades instead of the full-aperture ring. The technique of the aperture diameter variation described above may be applied to other lenses as well as the zoom lens, such as for instance macro-lenses which need the correction of the full-aperture diameter.

As is apparent from the above description, according to this invention, in addition to the ordinary aperture blades there are provided aperture blades which define only the full-aperture diameter which varies with zooming, as a result of which the full-aperture diameter is not changed by the operation of the release plate and it is unnecessary to provide the protective spring between the release plate and the opening and closing ring. Thus, the drawbacks accompanying the conventional zoom lens are eliminated. Since the aperture spring is not affected by the protective spring, the force of the lens stop driving spring can be increased, and accordingly a zoom lens having a large aperture diameter can be manufactured. Furthermore, even if the inertial mass in the lens stop movement is increased, in response to the increase of the inertial mass the operation of the release plate is accurately transmitted to the opening and closing ring. Therefore, a zoom lens large in lens stop movement can be manufactured. In addition, the aperture operation will never become irregular, and the effects of the invention should therefore by highly appreciated.

What is claimed is:

1. An aperture control apparatus for a zoom lens of the type capable of zooming movement between a first position having a first magnification and a second position having a second magnification, said apparatus of the type including a first plurality of aperture blades rotatably supported about respective axes, and first rotating means for rotating said blades to effect a desired aperture diameter, the improvement comprising:
    a second set of rotatable aperture blades; and
    second rotating means for rotating said second set of aperture blades as said lens is moved from its first to second positions to thereby change the maximum full aperture of said lens.

2. An apparatus as claimed in claim 1, the improvement further comprising:
    a support to which both of said first and second sets of aperture blades are rotatably supported wherein said second rotating means moves said support to rotate both of said first and second sets of aperture blades during said movement of said zoom lens.

3. An apparatus as claimed in claim 2, wherein said first and second sets of aperture blades are rotatably mounted to said support for rotation about common axes.

4. An apparatus as claimed in claim 2 or 3, wherein said zoom lens has an optical axis and wherein said support comprises an annular plate rotatable about said optical axis in accordance with said zooming movement, and wherein said second rotating means comprises:
    a plurality of shafts for rotatably supporting respective ones of said second set of aperture blades to said plate for rotation about respective first axes; an annular rotationally fixed full-aperture control ring having a plurality of camming grooves therein; and a first set of pins coupled to respective ones of said second set of blades and having axes non-aligned with said first axes, each of said first set of pins being received in a respective one of said grooves.

5. An apparatus as claimed in claim 4, wherein each of said second set of aperture blades is rotatably supported to one end of a respective one of said plurality of shafts, said shafts passing through said plate and each of said first set of aperture blades being fixedly secured to an opposite end of a respective shaft.

* * * * *